Dec. 25, 1923.  
G. A. HOFFMAN  
ATTACHMENT TO THRASHING MACHINES  
Filed April 4, 1923  
1,478,960  
2 Sheets-Sheet 1

INVENTOR.  
George A. Hoffman,  
BY  
Geo. P. Kimmel ATTORNEY.

Dec. 25, 1923.
G. A. HOFFMAN
1,478,960
ATTACHMENT TO THRASHING MACHINES
Filed April 4, 1923     2 Sheets-Sheet 2
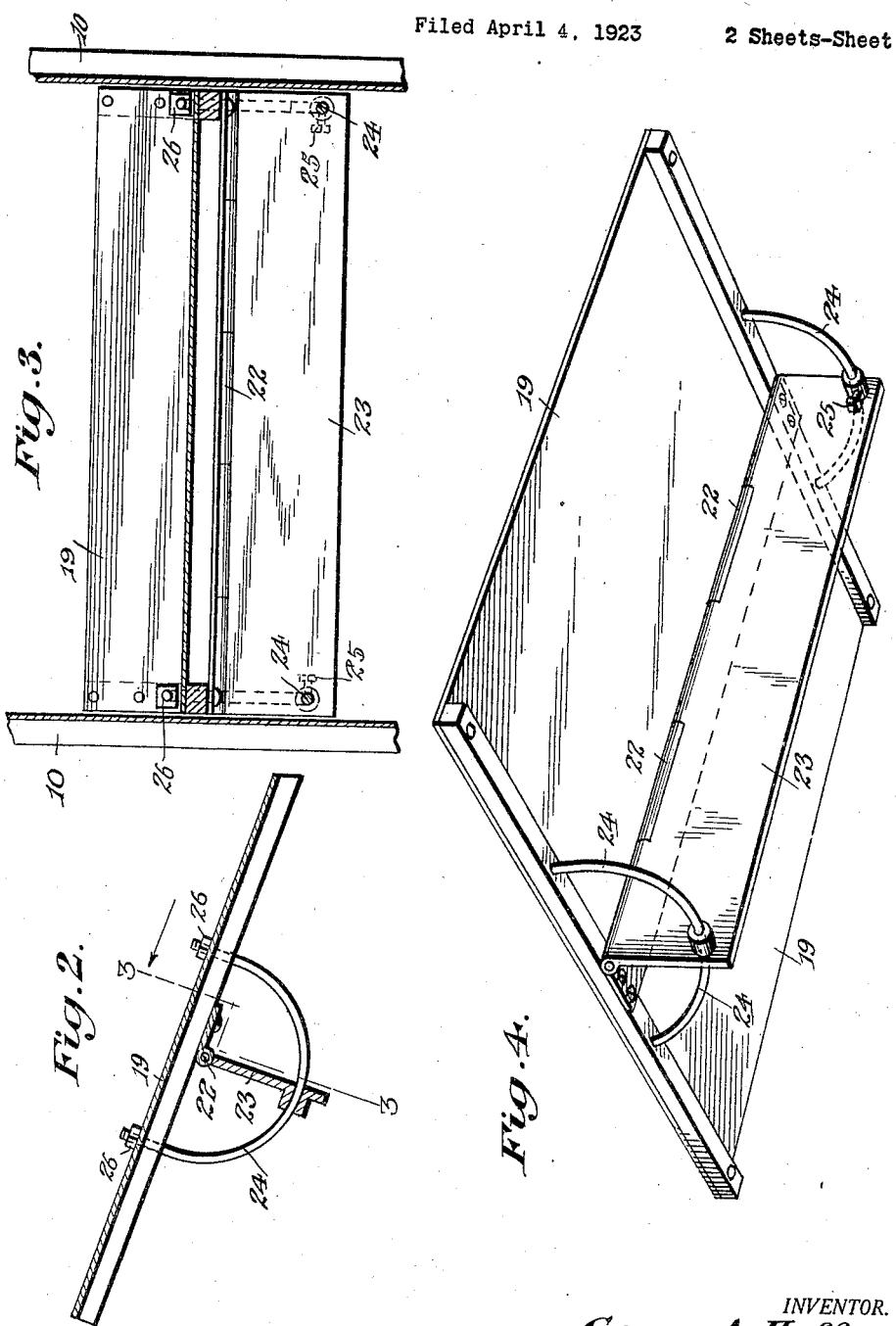
INVENTOR.
George A. Hoffman,
BY
Geo. T. Kimmel, ATTORNEY.

Patented Dec. 25, 1923.

1,478,960

UNITED STATES PATENT OFFICE.

GEORGE A. HOFFMAN, OF NESS CITY, KANSAS, ASSIGNOR OF ONE-HALF TO W. J. HARDER, OF ARNOLD, KANSAS.

ATTACHMENT TO THRASHING MACHINES.

Application filed April 4, 1923. Serial No. 629,912.

*To all whom it may concern:*

Be it known that I, GEORGE A. HOFFMAN, a citizen of the United States, residing at Ness City, in the county of Ness and State of Kansas, have invented certain new and useful Improvements in Attachments to Thrashing Machines, of which the following is a specification.

This invention relates to thrashing machines, and has for one of its objects to provide a simply constructed attachment whereby the grain discharged from the shoe screens and commingled with the chaff is prevented from being blown over into the straw pile, or the stacker fan.

With these and other objects in view the invention consists in certain novel features of construction as hereinafter shown and described and then specifically pointed out in the claims, and in the drawings illustrative of the preferred embodiment of the invention:—

Figure 2 is a longitudinal section enlarged of the improved device.

Figure 3 is a section on the line 3—3 of Figure 2 and portions of the side walls of the thresher body.

Figure 4 is an underneath perspective of the improved device.

Figure 1:
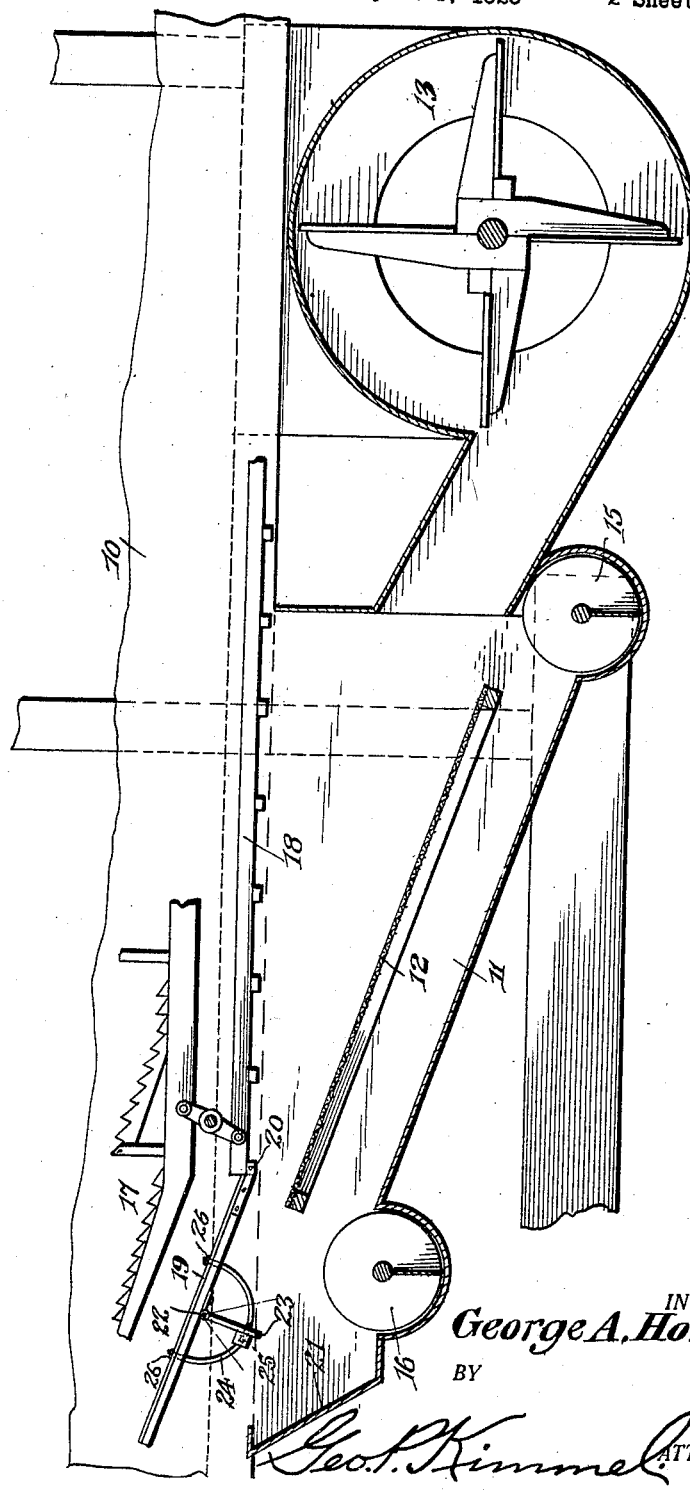
Figure 1 is a longitudinal sectional elevation of a portion of the rear or discharge end of a conventional thrashing machine with the improvement applied.

The improved device may be adapted without material structural change to various makes of thrashing machines, but for the purpose of illustration is shown applied to a conventional thresher including a part of the side walls of the body represented at 10, the shoe casing at 11, with one of the screens 12 therein, the main blast fan at 13, the grain auger at 15, the tailings auger at 16, a portion of the straw rack at 17, and a part of the grain pan at 18, these parts being of the usual construction.

The improved attachment comprises a supporting member or plate 19 connected at 20 to the discharge end of the grain pan and preferably inclined upwardly toward the discharge end of the thrashing machine.

The plate 19 is thus located directly above the discharge end of the screens of the shoe and also above the tailings auger and the inclined terminal 21 of the shoe 11.

Mounted to swing at 22 from the under face of the plate 19 is a baffle or retarder plate or wing 23 which thus projects into the path of the chaff blown over the screens and through the shoe, and deflects the latter downwardly toward the tailings auger, and thus retards the material and causes any grain which may be commingled with the chaff to settle into the tailings auger and thus prevented from being carried out into the straw pile.

Means are provided for holding the retarder mechanism in any desired position, for instance segmental rods 24 attached at the ends at 26 to the under side of the plate 19, the member 23 having a set screw 25 operating against one of the segmental rods 24, as shown.

The retarder member 23 may thus be adjusted to any required extent and held in adjusted position, as will be obvious.

By this simple device any grain which may be commingled with the chaff when blown over the tails of the screens, will be held back by the deflection of the chaff, and permitted to settle and fall into the tailings auger and thus be saved together with the other tailings, and prevented from being blown out with the chaff into the straw pile or stacker fan.

The improved device is simple in construction, can be manufactured of any suitable material and applied without material structural change to thrashing machines of various forms.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:

1. An attachment for thrashing machines comprising a plate adapted to be attached to the discharge end of the grain pan, and a retarder member pivotally connected to said plate and extending into the path of the material driven over the tail of the shoe screen.

2. An attachment for thrashing machines comprising a plate adapted to be attached to the discharge end of the grain pan, a retarder member pivotally connected to said plate and extending into the path of the material driven over the tail of the shoe screen, and means for adjustably supporting said retarder member to control its position relative to the grain pan and shoe screens.

3. The combination with the grain pan and screen shoe of a thrashing machine, of a plate extending from the discharge end of the grain pan, and a retarder member depending from the plate and extending into the path of the material discharged from the shoe.

4. An attachment for thrashing machines comprising a plate adapted to be attached to the discharge end of the grain pan, a retarder member pivotally connected to said plate and extending into the path of the material driven over the tail of the shoe screen, segmental members attached to the plate, and holding means carried by the retarder member and engaging the segmental members, whereby the position of the retarder member relative to the grain pan and shoe screens may be controlled.

In testimony whereof, I affix my signature hereto.

GEORGE A. HOFFMAN.